United States Patent [19]
Lam

[11] Patent Number: 6,163,444
[45] Date of Patent: Dec. 19, 2000

[54] CIRCUIT BREAKER

[76] Inventor: Sheir Chun Lam, Flat C, 8th Floor, Kam Lai Kok, 127-133 Lai Chi Kok Road, Tai Kok Tsui, Kowloon, The Hong Kong Special Administrative Region of the People's Republic of China

[21] Appl. No.: 09/236,364

[22] Filed: Jan. 25, 1999

[51] Int. Cl.[7] .................................................. H02H 3/00
[52] U.S. Cl. ............................................................ 361/42
[58] Field of Search .............................. 361/42–50, 77; 324/539–541, 82, 86

[56] References Cited

U.S. PATENT DOCUMENTS

| | | | |
|---|---|---|---|
| 3,851,216 | 11/1974 | Clarke et al. | 361/77 |
| 4,208,688 | 6/1980 | Misencik et al. | 361/46 |

*Primary Examiner*—Ronald W. Leja
*Attorney, Agent, or Firm*—Leydig, Voit & Mayer, Ltd.

[57] ABSTRACT

A circuit breaker for a power/load circuit including a three-phase AC power supply and a load connected to the power supply by three live power lines. The circuit breaker includes a tripping circuit including switches connected in series with respective power lines facing the power supply, a transformer having at least three balanced primary windings connected in series to respective power lines and a secondary winding, and a voltage comparator connected to the secondary winding for comparing a voltage induced in the transformer with a reference voltage and, in the event of a leakage fault, providing a tripping signal to the tripping circuit to open the switches. A circuit path including a combined voltage sensor/comparator extends across opposite sides and externally of the transformer for sensing and comparing two phase-to-phase voltages with each other and, in the event the voltage comparator detects a voltage imbalance fault simulating a leakage fault condition for the transformer, the voltage comparator provides a tripping signal.

17 Claims, 2 Drawing Sheets

6,163,444

CIRCUIT BREAKER

The present invention relates to a circuit breaker for disconnecting a load from an AC power supply in the event of a circuit fault.

BACKGROUND OF THE INVENTION

Circuit breakers for use in an AC power/load circuit are generally known. A typical circuit breaker includes a transformer for monitoring the current before and after flowing through the load and inducing a voltage when the current is unbalanced, for example, in the case of an earth leakage fault, a voltage comparator for comparing the induced voltage with a reference voltage and for generating a signal indicative of the voltage difference, and a switch for disconnecting the load from the power supply if the voltage difference is unacceptably large.

The invention seeks to provide an improved circuit breaker.

SUMMARY OF THE INVENTION

According to the invention, there is provided a circuit breaker for use in a power/load circuit formed by a three-phase AC power supply and a load connected to the power supply by means of three live power lines, which circuit breaker comprises a tripping circuit including normally-open switches connected in series with the respective power lines facing the power supply, a transformer having at least three balanced primary windings connected subsequently in series along the respective power lines and a secondary winding, a voltage comparator connected to the secondary winding for comparing a voltage induced in the transformer with a reference voltage and then in the event of a leakage fault in the power/load circuit providing a tripping signal for the tripping circuit to open the switches in order to disconnect the load from the power supply, and a circuit path comprising a combined voltage sensor/comparator and extending across opposite sides and externally of the transformer for sensing and comparing two phase-to-phase voltages of the power lines with each other and then in the event of a voltage imbalance fault in the power/load circuit simulating a leakage fault condition for the transformer to detect and the voltage comparator to provide a said tripping signal.

Preferably, the combined voltage sensor/comparator is arranged to sense the phase-to-phase voltages of the first and second power lines with respect to the third power line on one side of the transformer for comparison to provide an output connected to the opposite side of the transformer.

More preferably, the output of the combined voltage sensor/comparator is connected to the third power line on the opposite side of the transformer.

It is preferred that said one side of the transformer faces the power supply and said opposite side of the transformer faces the load.

In a preferred embodiment, the combined voltage sensor/comparator comprises first and second voltage comparators having respective pairs of inputs cross connected to the power lines for the first voltage comparator to compare one phase-to-phase voltage sensed with the other phase-to-phase voltage sensed and for the second voltage comparator to compare said other phase-to-phase voltage with said one phase-to-phase voltage.

More preferably, each of the first and second voltage comparators is provided with an input potential divider for the first voltage comparator to compare one phase-to-phase voltage sensed with a percentage of the other phase-to-phase voltage sensed and for the second voltage comparator to compare said other phase-to-phase voltage with a percentage of said one phase-to-phase voltage.

It is preferred further that the two percentages are substantially the same.

In the preferred embodiment, the combined voltage sensor/comparator includes an element connected in series along the circuit path for conduction to simulate a said leakage fault condition, said element having a control terminal connected to a combined output of the first and second voltage comparators.

More preferably, the element is provided by a silicon controlled rectifier.

The circuit breaker may preferably include a second transformer having at least three slightly unbalanced primary windings connected in series along the respective power lines and a secondary winding, and an associated voltage comparator connected to the secondary winding for comparing a voltage induced in the transformer with a reference voltage and then in the event of an over-current fault in the power/load circuit providing a tripping signal for the tripping circuit to open the switches in order to disconnect the load from the power supply.

BRIEF DESCRIPTION OF DRAWINGS

The invention will now be more particularly described, by way of example only, with reference to the accompanying drawings, in which.

DETAILED DESCRIPTION OF PREFERRED EMBODIMENTS

Figure 1:
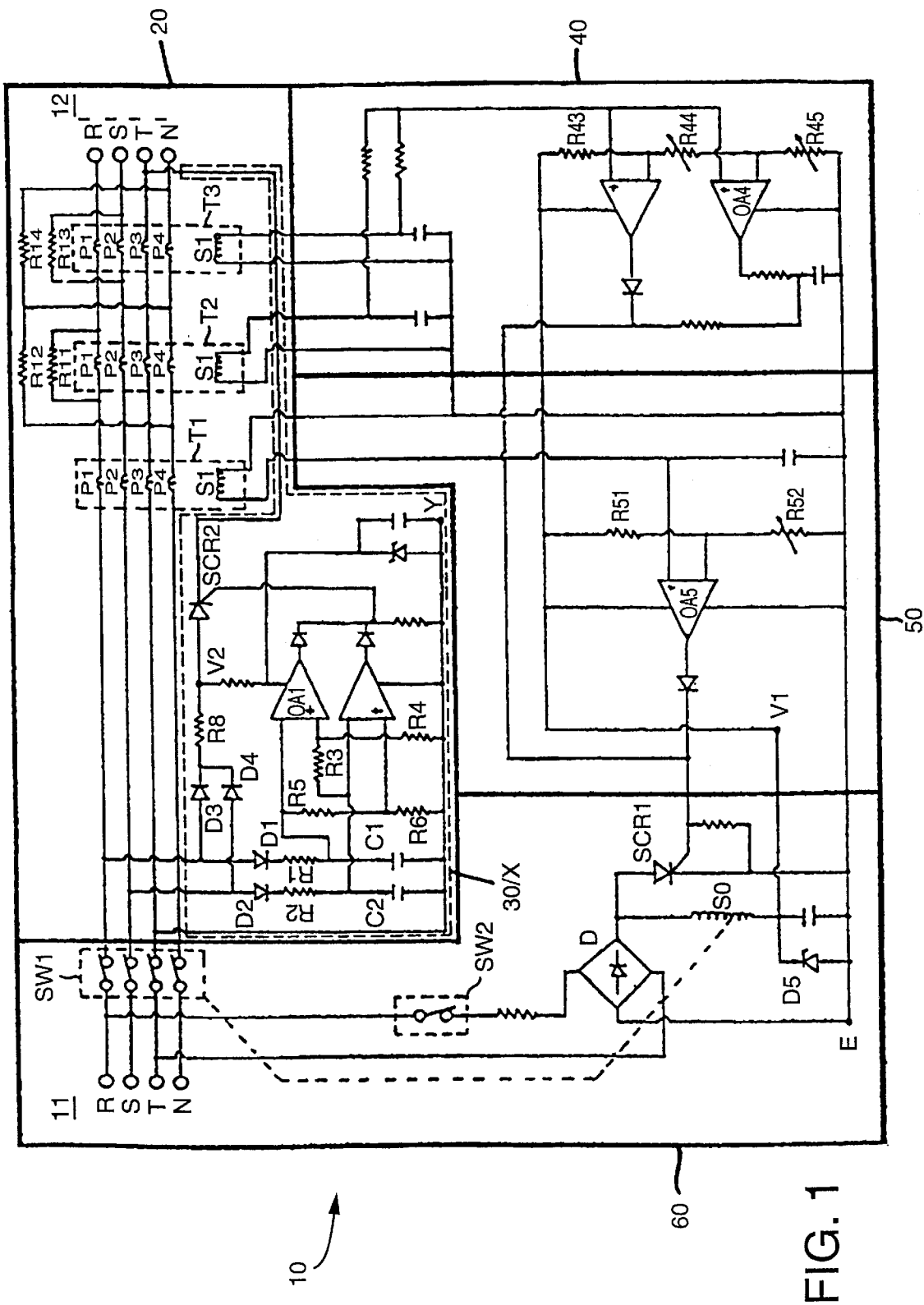
FIG. 1 is a circuit diagram of a first embodiment of a circuit breaker in accordance with the invention.

Referring initially to FIG. 1 of the drawings, there is shown a first circuit breaker 10 embodying the invention, which is for use in a power/load circuit including a three-phase mains power supply 11 and a load 12 connected to the power supply 11 by means of three live power lines R-R', S-S' and T-T' and a neutral power line N-N'. The circuit breaker 10 comprises a fault sensor circuit 20 associated with the power lines R-R', S-S', T-T' and N-N', first and second comparator circuits 40 and 50 connected separately to the fault sensor circuit 20 for fault detection and providing a tripping signal, and a tripping circuit 60 connected to the comparator circuits 40 and 50 for breaking the power/load circuit in response to the tripping signal.

The tripping circuit 60 includes a set of four normally open switches SW1 connected in series with the respective power lines R-R', S-S', T-T' and N-N' facing the power supply 11, a solenoid SO for normally holding the switches SW1 closed, and a silicon-controlled rectifier SCR1 connected in parallel with and for disabling (short-circuiting) the solenoid SO to open the switches SW1 in order to disconnect the load 12 from the power supply 11. The tripping circuit 60 includes a full-wave rectifier D for picking up power from the power nodes R and T to drive the solenoid SO via a micro switch SW2 and to drive the comparator circuits 40 and 50 via a zener diode D5 providing a voltage node V1, the circuits 40, 50 and 60 sharing a common ground E.

The fault sensor circuit 20 includes a combined voltage sensor/comparator 30 connected to the three live power lines R-R', S-S' and T-T' and respective current sensing transformers T1 to T3 each having four primary windings P1 to P4 connected in series in respective power lines R-R', S-S', T-T' and N-N' at a position downstream of the switches SW1 and a secondary winding S1. The primary windings P1 to P4 of the transformer T1 are balanced for detecting, by itself, any intolerable earth leakage fault and, in combination with the voltage sensor/comparator 30, any intolerable phase voltage imbalance, including phase failure (missing), in the power/load circuit for action by the comparator circuit 50.

The primary windings P1 to P4 of the transformer T2 are made slightly unbalanced by means of resistors R11 and R12 connected in parallel with the primary windings P1 and P4, respectively. The primary windings P1 to P4 of the transformer T3 are made slightly unbalanced by means of resistors R13 and R14 connected in parallel with the primary windings P2 and P4, respectively. These two transformers T2 and T3 are for detecting any intolerable over-current, including a short-circuit fault, in the power/load circuit for action by the comparator circuit 40.

The voltage sensor/comparator 30 includes a pair of OP-AMP (operational amplifier) voltage comparators OA1 and OA2 and a silicon-controlled rectifier SCR2. The sensor/comparator 30 has two inputs and a common node Y connected to respective live power lines R-R', S-S' and T-T' on the side of the transformers T1 to T3 facing the power supply 11 and an output connected to the live power line T-T' on the side of the transformers T1 to T3 facing the load 12. Thus, the voltage sensor/comparator 30 provides a circuit path X extending from the power nodes R and S to the power node T' across opposite sides of the power lines R-R', S-S' and T-T' with respect to and externally of the transformers T1 to T3.

The two inputs of the voltage sensor/comparator 30 are provided by respective comparators OA1 and OA2. Each comparator OA1 (or OA2) has a first input connected to a respective power node R (or S) by means of a diode-resistor-capacitor circuit D1-R1-C1 (or D2-R2-C2) across the power node R (or S) and the remaining power node T which provides the common node Y. The second input of each comparator OA1 (or OA2) is connected to the first input of the other comparator OA2 (or OA1) by means of respective potential dividing resistors R3/R4 (or RS/R6) across the said first input and the common node Y. Accordingly, the inputs of the comparators OA1 and OA2 are cross connected to the power lines R-R', S-S' and T-T'.

In operation, each comparator OA1 (or OA2) senses a respective phase-to-phase voltage R-T (or S-T) of the power supply 11, with a percentage of the same phase-to-phase voltage R-T (or S-T) being sensed by the other comparator OA2 (or OA1). Accordingly, the comparators OA1 and OA2 are arranged to cross compare one phase-to-phase voltage R-T (or S-T) with a percentage (the same percentage) of the other phase-to-phase voltage S-T (or R-T), covering all the three phases voltages R-S-T. While the three phase voltages R-S-T are balanced in a healthy condition, the voltage differences as sensed by both comparators OA1 and OA2 are equal and their logic outputs will be the same (at logic low). In the event of an intolerable phase voltage imbalance (or a phase failure) in the power/load circuit, the voltage differences as sensed by the comparators OA1 and OA2 will change in opposite directions, with one voltage difference increasing while the other voltage difference decreases. This will cause the logic output of one of the comparators OA1 and OA2 and in turn, their combined output, to toggle (to logic high).

The cross comparison by the comparators OA1 and OA2 between the two phase-to-phase voltages R-T and S-T is twice as sensitive as the comparison of either phase-to-phase voltage R-T or S-T against a fixed reference voltage.

The rectifier SCR2 has an anode connected to the power nodes R and S by means of a common resistor R8 and respective diodes D3 and D4 (also for providing a voltage node V2 for driving the comparators OA1 and OA2), a cathode acting as the output of the sensing comparator circuit 30 connected to the power node T', and a gate connected to the combined output of the comparators OA1 and OA2 for control. When the combined logic output of comparators OA1 and OA2 toggles to logic high, the rectifier SCR2 will be turned on and thus connect the two power nodes R and S to the power node T' via the aforesaid circuit path X externally of the transformers T1 to T3. This will simulate an earth leakage fault in the power/load circuit for the transformer T1 to detect and the comparator circuit 50 to provide a tripping signal as described above.

The comparator circuit 40 includes an OP-AMP voltage comparator OA3, an OP-AMP current integrator OA4, and resistors R43/R44/R45 acting as a potential divider connected across the voltage node V1 and the ground E. The comparator OA3 and integrator OA4 have respective first inputs connected together to a first end of the secondary windings S1 of the transformers T2 and T3, second inputs provided with respective reference voltages by means of the resistors R43/R44/R45, and a combined output connected to the gate of the rectifier SCR1 of the tripping circuit 60. The comparator OA3 and integrator OA4 turn on the rectifier SCR1 in response to the transformers T2 and T3 detecting the occurrence of a short-circuit current or an intolerable overload current in the power/load circuit.

The comparator circuit 50 includes an OP-AMP voltage comparator OA5 which has a first input connected to a first end of the seconding winding S1 of the transformer T1, a second input provided with a reference voltage by means of resistors R51/R52 acting as a potential divider connected across the voltage node V1 and the ground E, and an output connected to the gate of the rectifier SCR1 of the tripping circuit 60. The comparator OA5 turns on the rectifier SCR1 in response to the transformer T1 alone detecting the occurrence of any intolerable earth leakage fault in the power/load circuit or the transformer T1 in combination with the voltage sensor/comparator 30 detecting the occurrence of an intolerable phase voltage imbalance or a phase failure.

The second ends of the secondary windings S1 of all the transformers T1 to T3 are connected to the ground E.

In the event of a circuit fault, under the control of the comparator circuits 40 and 50 in conjunction with the sensor fault circuit 20 as described above, the tripping circuit 60 will disconnect the load 12 from the power supply 11 through the opening of the switches SW1. The switches SW1 can only be re-closed manually after the circuit fault has been cleared. The types of circuit faults that can be handled by the circuit beaker 10 comprise (1) phase voltage imbalance, (2) phase failure, (3) short-circuit current, (4) overload current and (5) earth fault leakage current.

Figure 2:
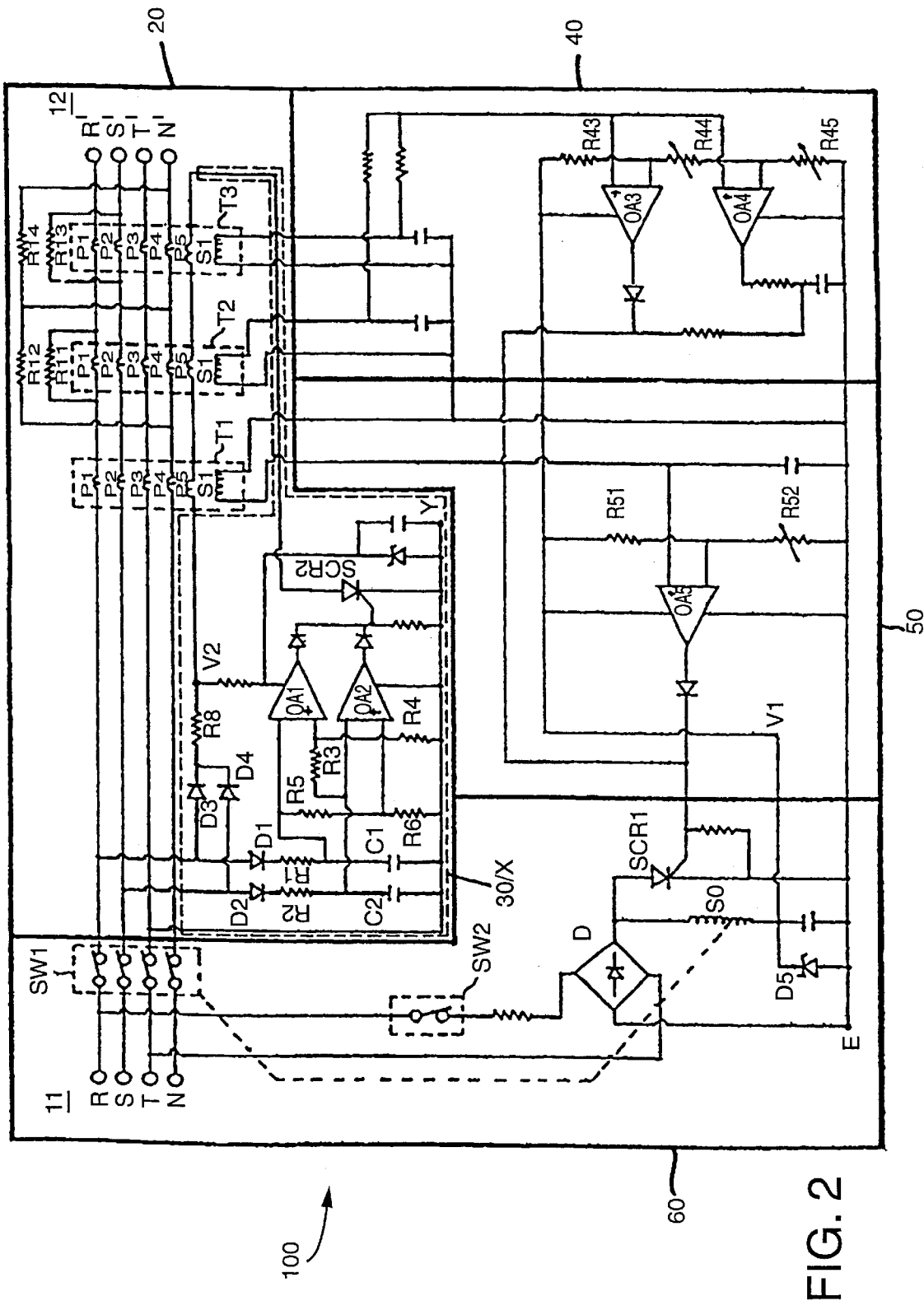
FIG. 2 is a circuit diagram of a second embodiment of a circuit breaker in accordance with the invention.

FIG. 2 shows a second circuit breaker 100 embodying the invention, which is implemented and operates in a manner very similar to that of the first circuit breaker 10, with equivalent parts designated by the same reference numerals. The circuit breaker 100 has two major differences.

The first difference lies in the provision of an additional line O-O' co-extending with the power lines R-R', S-S', T-T' and N-N' through the transformers T1 to T3, with the transformers T1 to T3 including respective fifth primary windings P5 connected in series along the line O-O'. Also, the output of the voltage sensor/comparator 30 is connected to the end O' of the line O-O', instead of the power node T'.

The second difference lies in the rectifier SCR2 of the voltage sensor/comparator 30 being connected with its cathode to the common node Y and its anode acting as the output of voltage sensor/comparator 30.

The invention has been given by way of example only, and various other modifications of and/or alterations to the described embodiments may be made by persons skilled in the art without departing from the scope of the invention as specified in the appended claims.

What is claimed is:

1. A circuit breaker for use in a power/load circuit, the circuit breaker comprising:

a tripping circuit including switches connected in series with respective power lines of a three-phase power supply, a first transformer having at least three balanced primary windings, each primary winding being connected in series with a respective one of the power lines, and a secondary winding, a voltage comparator connected to the secondary winding of the first transformer for comparing a voltage induced in the secondary winding of the first transformer with a reference voltage and, in the event of a leakage fault in the power/load circuit, providing a tripping signal to the tripping circuit to open the switches and disconnect the load from the power supply, and a circuit path comprising a combined voltage sensor/comparator and extending across and externally of the first transformer for sensing and comparing pairs of phase-to-phase voltages of respective pairs of the power lines with each other for detecting a voltage imbalance fault in the power/load circuit and, in response to detection of a voltage imbalance fault, simulating a leakage fault condition of the first transformer and, in response, providing a tripping signal to the tripping circuit to open the switches and disconnect the load from the power supply.

2. The circuit breaker as claimed in claim 1, wherein the combined voltage sensor/comparator senses the phase-to-phase voltages of first and second power lines with respect to a third power line on a first side of the first transformer and provides an output to a second side, opposite the first side, of the first transformer.

3. The circuit breaker as claimed in claim 2, wherein the combined voltage sensor/comparator is connected to provide an output to the third power line on the second side of the first transformer.

4. The circuit breaker as claimed in claim 2, wherein the first side of the first transformer faces the power supply and the second side of the first transformer faces the load.

5. The circuit breaker as claimed in claim 1, wherein the combined voltage sensor/comparator comprises first and second voltage comparators having respective pairs of inputs cross connected to the power lines so the first and second voltage comparators compare a first phase-to-phase voltage age to a second phase-to-phase voltage.

6. The circuit breaker as claimed in claim 5, including an input potential divider for the first and second voltage comparators to compare the first phase-to-phase voltage with a percentage of the second phase-to-phase voltage and to compare the second phase-to-phase voltage with a percentage of the first phase-to-phase voltage.

7. The circuit breaker as claimed in claim 6, wherein the two percentages are substantially the same.

8. The circuit breaker as claimed in claim 5, wherein the combined voltage sensor/comparator includes an element connected in series along the circuit path for simulating the leakage fault condition, the element having a control terminal connected to a combined output of the first and second voltage comparators.

9. The circuit breaker as claimed in claim 8, wherein the element is a silicon controlled rectifier.

10. The circuit breaker as claimed in claim 1, including a second transformer having at least three unbalanced primary windings, each winding being connected in series with a respective one of the power lines, and a secondary winding, and a second voltage comparator connected to the secondary winding of the second transformer for comparing a voltage induced in the secondary winding of the second transformer with a reference voltage and, in the event of an over-current fault in the power/load circuit, providing a tripping signal to the tripping circuit to open the switches in order to disconnect the load from the power supply.

11. The circuit breaker as claimed in claim 3, wherein the first side of the first transformer faces the power supply and the second side of the first transformer faces the load.

12. The circuit breaker as claimed in claim 2, wherein the combined voltage sensor/comparator comprises first and second voltage comparators having respective pairs of inputs cross connected to the power lines so the first and second voltage comparators compare a first phase-to-phase voltage to a second phase-to-phase voltage.

13. The circuit breaker as claimed in claim 12, including an input potential divider for the first and second voltage comparators to compare the first phase-to-phase voltage with a percentage of the second phase-to-phase voltage and to compare the second phase-to-phase voltage with a percentage of the first phase-to-phase voltage.

14. The circuit breaker as claimed in claim 13, wherein the two percentages are substantially the same.

15. The circuit breaker as claimed in claim 12, wherein the combined voltage sensor/comparator includes an element connected in series along the circuit path for simulating the leakage fault condition, the element having a control terminal connected to a combined output of the first and second voltage comparators.

16. The circuit breaker as claimed in claim 15, wherein the element is a silicon controlled rectifier.

17. The circuit breaker as claimed in claim 2, including a second transformer having at least three unbalanced primary windings, each winding being connected in series with a respective one of the power lines, and a secondary winding, and a second voltage comparator connected to the secondary winding of the second transformer for comparing a voltage induced in the secondary winding of the second transformer with a reference voltage and, in the event of an over-current fault in the power/load circuit, providing a tripping signal to the tripping circuit to open the switches in order to disconnect the load from the power supply.

* * * * *